US010049272B2

(12) United States Patent
Agrawal et al.

(10) Patent No.: US 10,049,272 B2
(45) Date of Patent: Aug. 14, 2018

(54) USER AUTHENTICATION USING MULTIPLE CAPTURE TECHNIQUES

(71) Applicant: MICROSOFT TECHNOLOGY LICENSING, LLC, Redmond, WA (US)

(72) Inventors: Mudit Agrawal, Redmond, WA (US); Karlton David Powell, Lake Stevens, WA (US); Christopher Maurice Mei, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 90 days.

(21) Appl. No.: 14/864,622

(22) Filed: Sep. 24, 2015

(65) Prior Publication Data
US 2017/0091548 A1 Mar. 30, 2017

(51) Int. Cl.
*G06K 9/00* (2006.01)
*G06F 21/32* (2013.01)
(Continued)

(52) U.S. Cl.
CPC ......... *G06K 9/00604* (2013.01); *G06F 21/32* (2013.01); *G06K 9/00617* (2013.01);
(Continued)

(58) Field of Classification Search
CPC ........... G06K 9/00604; G06K 9/00597; G06K 9/00617; G06K 9/2018; G06K 9/2027;
(Continued)

(56) References Cited

U.S. PATENT DOCUMENTS 6,785,406 B1  8/2004 Kamada
7,147,153 B2  12/2006 Rowe et al.
(Continued)

FOREIGN PATENT DOCUMENTS

JP   2005062990 A  *  3/2005
WO  2015127313 A1   8/2015

OTHER PUBLICATIONS

Daugman et al. "Statistical Richness of Visual Phase Information-Update on Recognizing Persons by Iris Patterns." International Journal of Computer Vision 45(1), 2001, 25-38.*
(Continued)

*Primary Examiner* — Jon Chang
(74) *Attorney, Agent, or Firm* — Alleman Hall Creasman & Tuttle LLP

(57) ABSTRACT

Examples are disclosed herein that relate to user authentication. One example provides a biometric identification system comprising an iris illuminator, an image sensor configured to capture light reflected from irises of a user as a result of those irises being illuminated by the iris illuminator, a drive circuit configured to drive the iris illuminator in a first mode and a second mode that each cause the irises to be illuminated differently, the first and second modes thereby yielding a first mode output at the image sensor and a second mode output at the image sensor, respectively, and a processor configured to process at least one of the first mode output and the second mode output and, in response to such processing, select one of the first mode and the second mode for use in performing an iris authentication on the user.

23 Claims, 8 Drawing Sheets

(51) Int. Cl.
*G06K 9/20* (2006.01)
*G06K 9/22* (2006.01)

(52) U.S. Cl.
CPC ............ *G06K 9/209* (2013.01); *G06K 9/2018* (2013.01); *G06K 9/2027* (2013.01); *G06K 9/22* (2013.01); *G06K 9/00597* (2013.01); *G06K 9/00912* (2013.01)

(58) Field of Classification Search
CPC ...... G06K 9/209; G06K 9/22; G06K 9/00912; G06F 21/32
USPC ................................ 382/117; 340/5.83, 5.53
See application file for complete search history.

(56) References Cited

U.S. PATENT DOCUMENTS

| | | | |
|---|---|---|---|
| 7,248,720 | B2 | 7/2007 | Muller et al. |
| 7,428,320 | B2 | 9/2008 | Northcott et al. |
| 7,512,254 | B2 | 3/2009 | Vollkommer et al. |
| 7,574,021 | B2 | 8/2009 | Matey |
| 7,796,784 | B2 | 9/2010 | Kondo et al. |
| 7,986,816 | B1 | 7/2011 | Hoanca et al. |
| 8,025,399 | B2 | 9/2011 | Northcott et al. |
| 8,085,994 | B2 | 12/2011 | Kim |
| 8,170,293 | B2 | 5/2012 | Tosa et al. |
| 8,317,325 | B2 | 11/2012 | Raguin et al. |
| 8,374,404 | B2 | 2/2013 | Williams et al. |
| 8,391,567 | B2 | 3/2013 | Friedman et al. |
| 8,437,513 | B1 * | 5/2013 | Derakhshani ...... G06K 9/00597 382/115 |
| 8,953,849 | B2 | 2/2015 | Hanna |
| 8,953,850 | B2 | 2/2015 | Inkumsah et al. |
| 2003/0169334 | A1 | 9/2003 | Braithwaite et al. |
| 2004/0170304 | A1 * | 9/2004 | Haven .................... A61B 3/113 382/115 |
| 2005/0084179 | A1 | 4/2005 | Hanna et al. |
| 2008/0002863 | A1 | 1/2008 | Northcott et al. |
| 2012/0293643 | A1 | 11/2012 | Hanna |
| 2013/0044055 | A1 | 2/2013 | Karmarkar et al. |
| 2013/0293577 | A1 | 11/2013 | Perez et al. |
| 2014/0050371 | A1 | 2/2014 | Inkumsah et al. |
| 2014/0112550 | A1 | 4/2014 | Hanna |
| 2014/0289834 | A1 | 9/2014 | Lindemann |
| 2015/0235070 | A1 * | 8/2015 | Wang ................. G06K 9/00006 382/115 |

OTHER PUBLICATIONS

English Translation of JP2005-62990A (Mori).*
Wong, R. et al., "Interactive Quality-Driven Feedback for Biometric Systems", In the Proceedings of Fourth IEEE International Conference on Biometrics: Theory Applications and Systems, Sep. 27, 2010, Washington, DC, 7 pages.
ISA European Patent Office, International Search Report and Written Opinion Issued in PCT Application No. PCT/US2016/045943, dated Nov. 10, 2016, WIPO, 13 pages.
Darwish, et al., "Biometric Identification Using the Dynamic Features of the Eyes", In Proceedings of IEEE Sixth International Conference on Biometrics: Theory, Applications and Systems, Sep. 29, 2013, 6 pages.
Alheeti, Khattab M. Ali, "Biometric Iris Recognition Based on Hybrid Technique", In International Journal on Soft Computing, vol. 2, Issue 4, Nov. 2011, 9 pages.
"Iris recognition—the Saviour of Performance in India's UID Scheme?", Published on: Feb. 6, 2012 Available at: http://www.planetbiometrics.com/article-details/i/1015/.
Daugman, John, "Statistical Richness of Visual Phase Information: Update on Recognizing Persons by Iris Patterns", In International Journal of Computer Vision, vol. 45, Issue 1, Oct. 1, 2001, 2 pages.
Narayanswamy, et al., "Extended depth-of-field iris recognition system for a workstation environment", In Proceedings of SPIE Biometric Technology for Human Identification II, vol. 5779, Mar. 28, 2005, 10 pages.
Gracht, et al., "Iris Recognition with Enhanced Depth-of-Field Image Acquisition", In Proceedings of SPIE Visual Information Processing XIII, vol. 5438, Jul. 15, 2004, 10 pages.

* cited by examiner

USER AUTHENTICATION USING MULTIPLE CAPTURE TECHNIQUES

BACKGROUND

In many computing environments, user authentication is performed to ensure that certain computing resources are accessed only by authorized users. Iris recognition is one mechanism for performing user authentication. To achieve an acceptable false positive rate, however, constraints may be placed on the optics of an iris recognition system that may render the system unsuitable for some use scenarios.

SUMMARY

Examples are disclosed herein that relate to user authentication. One example provides a biometric identification system comprising an iris illuminator, an image sensor configured to capture light reflected from irises of a user as a result of those irises being illuminated by the iris illuminator, a drive circuit configured to drive the iris illuminator in a first mode and a second mode that each cause the irises to be illuminated differently, the first and second modes thereby yielding a first mode output at the image sensor and a second mode output at the image sensor, respectively, and a processor configured to process at least one of the first mode output and the second mode output and, in response to such processing, select one of the first mode and the second mode for use in performing an iris authentication on the user.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

In many computing environments, user authentication is desired for limiting access to computing resources (e.g., data, hardware) only to users explicitly permitted to access such resources. On some computing platforms, biometrics are measured to facilitate user authentication. A biometric measurement process may include imaging and authenticating one or both irises of a user, for example. The human iris is a sophisticated structure exhibiting a large degree of variance between humans, and as such can provide a useful biometric.

To achieve a relatively low false positive rate (e.g., one in one million) in iris recognition/authentication, it will often be desirable to impose various constraints on the capture environment and hardware used to illuminate and image the irises. For example, image capture at high resolutions with bright illumination of a human subject may be desired. Nonetheless, a variety of factors can greatly reduce the effectiveness of iris recognition, such as unfocused imaging, noise, off-axis iris imaging, iris glint and occlusion, and perspective and affine distortions. These factors, along with the optical qualities desired in an iris recognition system, have led to the design of relatively large, stationary apparatuses that often force a user to place his or her head in a highly constrained (e.g., fixed) location. As a result, iris recognition systems designed in this manner greatly restrict the contexts in which iris recognition can be performed—for example, such systems may be unsuitable for mobile use cases in which iris recognition is desired on the fly at arbitrary locations.

Accordingly, examples are disclosed herein for authenticating users with a biometric identification system using iris authentication that can be implemented in a mobile device. As described in further detail below, the reduction in iris recognition accuracy resulting from the spatial constraints imposed on the optics by their inclusion in a mobile device may be compensated by using first and second modes of iris illumination. In one example, this reduction may be compensated by combining partial images of both irises of a user. Further, approaches to using multifactor biometric identification are disclosed.

Figure 1:
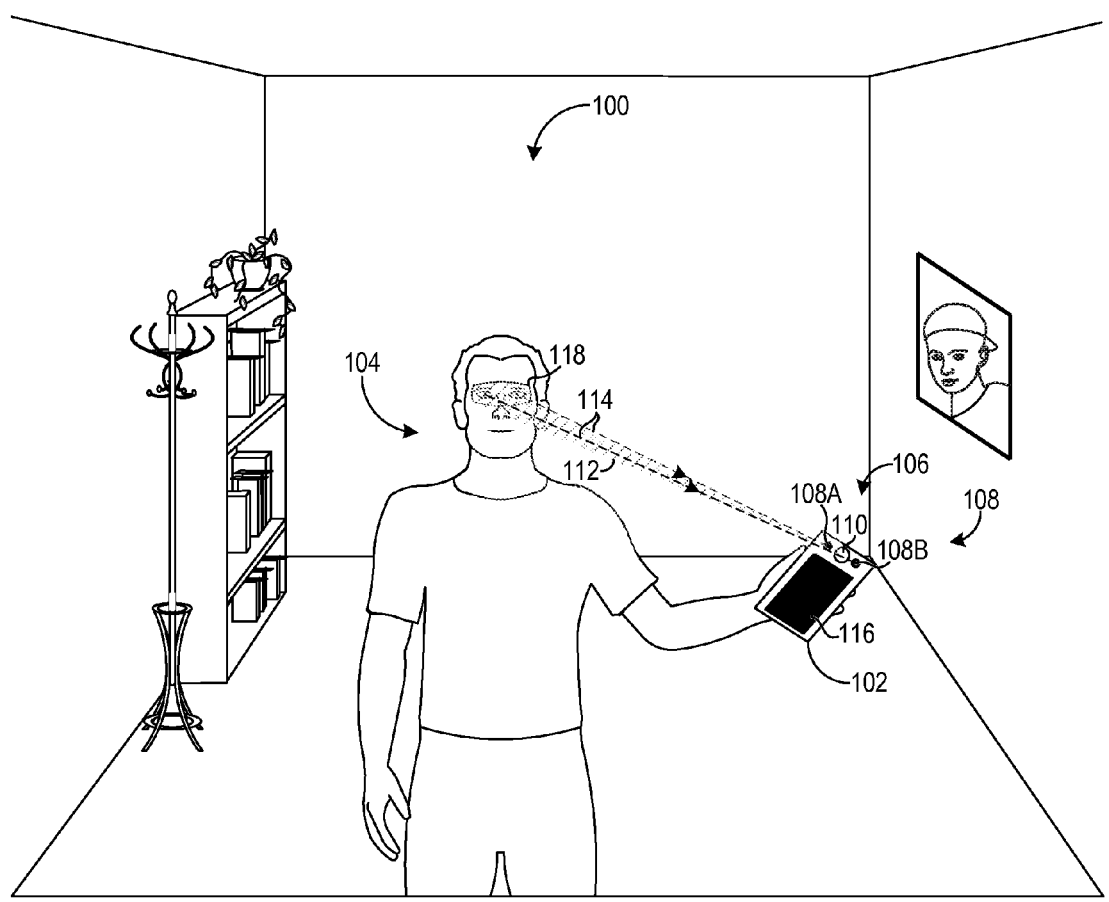
FIG. 1 shows an example environment in which user authentication is performed on a mobile device.

FIG. 1 shows an example environment 100 in which user authentication is performed on a mobile device 102 for a user 104. While environment 100 is depicted as a home environment, the approaches described herein are applicable to any suitable environment. Further, mobile device 102 is depicted as a smartphone, but may assume any suitable form including that of another mobile computing device, wearable computing device (e.g., head mounted display), etc. The approaches described herein are also applicable to non-mobile devices such as a desktop computing device and/or a server computing device. Example computing device hardware and configurations are described below with reference to FIG. 7.

To facilitate authentication of user 104, mobile device 102 includes a biometric identification system 106. Among other potential biometrics, system 106 may be configured to capture images of one or both irises of the eyes of user 104. As such, system 106 includes an iris illuminator 108 operable to illuminate one or both irises of user 104, and an image sensor 110 configured to capture light reflected from one or both irises of the user as a result of those irises being illuminated by the iris illuminator. As a non-limiting example, FIG. 1 shows emitted light 112 emitted from iris illuminator 108 incident upon both irises of user 104, and reflected light 114 reflected from the irises as a result of their illumination by emitted light 112. In the depicted example, at least a portion of reflected light 114 is captured by image sensor 110. Once captured at image sensor 110, the portion of reflected light 114 may then be sensed and processed for authenticating user 104.

The optical configuration of biometric identification system 106 may enable user authentication to be performed while mobile device 102 is held in a manner that user 104 would hold the mobile device in the course of normally operating the mobile device—e.g., at so-called "arm's length" distances, such as roughly 20-60 centimeters. In the example depicted in FIG. 1, the emission angle of iris illuminator 108 facilitates sufficient illumination of both irises of user 104 at such distances, while the field of view (FOV) of image sensor 110 is sufficiently large to capture a usable portion of light reflected from both irises also from such distances. These qualities of biometric identification system 106 may enable a user experience in which user 104 is authenticated that is non-disruptive and fast (e.g., between 1 and 5 seconds), and that can take place at arbitrary locations on the fly.

As part of authenticating user 104, mobile device 102 may be configured to perform actions beyond an initial authentication step in which one or both of the irises of the user are imaged. For example, mobile device 102 may compare data derived from one or more iris images to an iris data threshold, and, if the data does not meet the threshold, may prompt user 104 to adjust his or her gaze and/or head orientation. Alteration of gaze may address insufficiency in iris data due to glint/glare, while alteration of head orientation may address insufficiency in iris data due to iris occlusion (e.g., by glasses worn by user 104). The iris data threshold may be selected such that iris data meeting the threshold provides a desired false positive rate, for example.

Mobile device 102 may be configured to collect other eye biometrics in addition to iris data. For example, mobile device 102 may assess the movement characteristics of one or both of the eyes of user 104 by displaying, via a display 116 of the mobile device, at least partially predetermined visual content, and tracking the movement of one or both of the eyes of the user in response to display of the predetermined visual content. Alternatively or additionally, mobile device 102 may modulate the output of iris illuminator 108 to assess the constriction and/or dilation characteristics of one or both of the eyes of user 104; for example, the output of the iris illuminator may be adjusted in stepwise fashion, and the amount, rate, and delay of change in pupil size measured. In each of these cases, the sensed user response may be compared against known references for the user to perform/support authentication.

FIG. 1 shows a facial region 118 of user 104 illuminated by iris illuminator 108. Facial region 118 includes both irises of user 104. As such, illumination of facial region 118 may enable the collection of at least partial images of both irises of user 104. Facial region 118 also includes facial features of user 104 other than the irises. As such, illumination of facial region 118 may consequently enable the capture of light reflected from the face of user 104 and thus collection of facial biometrics. The collection of facial biometrics may augment iris authentication, and may be performed automatically by mobile device 102 or after notifying user 104 that additional biometrics beyond iris image(s) are to be collected (e.g., due to iris data not meeting the iris data threshold, iris data not containing sufficient signal to achieve a desired false accept rate). As non-limiting examples, mobile device 102 may authenticate one or more of the following facial features of user 104: pupil boundary, limbus boundary, interpupilary distance (IPD), eye shape, eyelid shape, eyebrow shape, and iris-to-pupil illumination ratio (described below). Measurement of eyelid shape in particular may aid in precisely masking an iris and identifying the relevant features of an iris, for example.

In some cases, iris recognition challenges may arise due to optical limitations imposed on biometric identification system 106 by its housing in mobile device 102—for example, limited resolution, FOV, etc. This may be mitigated by imaging both irises of user 104 from approximately the same location. Specifically, as described in further detail below, optical limitations or other conditions may restrict biometric identification system 106 to collecting partial, and not full, images of the irises of user 104. In other cases, full iris images are obtained, but only portions of the images are usable. The present description contemplates use of these partial images to perform authentication. Specifically, partial images of both irises of the user may be combined, with user authentication being based on the resultant combined iris image. A combined iris image produced from two partial iris images may provide more useful data than a single, full iris image alone, for example. Alternative or additional techniques, such as multi-modal iris illumination and the collection of facial biometrics, may also bolster iris recognition.

Mobile device 102 may be configured to capture images of both irises of user 104 simultaneously, while in other implementations the mobile device may capture images of each iris in an alternate, time-sequential manner—e.g., capture of a left iris image followed by capture of a right iris image. Time-sequential image capture may be employed whether or not facial region 118 includes both irises of user 104. FIG. 1 depicts an example in which iris illuminator 108 includes a first light source 108A and a second light source 108B that are spatially separated. First and second light sources 108A and 108B may be of any suitable type, such as light emitting diodes (LEDs), for example. In such a configuration, time-sequential image capture may include alternately driving the first and second light sources 108A and 108B and capturing one or more images for each alternation between the light sources, for example. In some cases, a given mode (i.e., source 108A being driven) will produce imagery of both irises. In other cases a mode will produce imagery of only one iris. Due to the FOV of image sensor 110, and as indicated above, each image may include imagery of both irises, though one iris may be illuminated to a greater degree than the other iris as a result of alternately driving first and second light sources 108A and 108B. Implementations are contemplated, however, in which one, three, or more than three light sources are employed, as well as those in which two or more light sources are placed at approximately the same location and concurrently or alternately driven. Additional detail regarding time-sequential image capture, as well as time-sequential modulation of the output of iris illuminator 108, is provided below with reference to FIG. 3.

The relative placement of iris illuminator 108 (and its light sources 108A and 108B) and image sensor 110 on mobile device 102 partially determines the angle subtended between the image sensor and the iris illuminator from the location of a user's eye in object space. This angle in turn affects the illumination, and thus the illumination perceived by image sensor 110, of the user's eye's pupil relative to the iris, which can significantly impact iris authentication—relatively similar perceived illumination of the iris and pupil (a condition referred to as "grey pupil") can increase the difficulty of distinguishing between the iris and pupil, and thus reduce the efficacy of iris authentication. Thus, it may be desirable to illuminate the iris and pupil of a given eye to significantly different degrees. Grey pupil may correspond to subtended angles between 2° and 8°, for example, and as such, the relative placement of iris illuminator 108 and image sensor 110 may be chosen to avoid such angles. In another implementation, two or more light sources of an iris illuminator may be placed at various angles to produce a varying grey-pupil effect, which can also aid in detecting pupil boundaries (e.g., using image subtraction).

Figure 2:
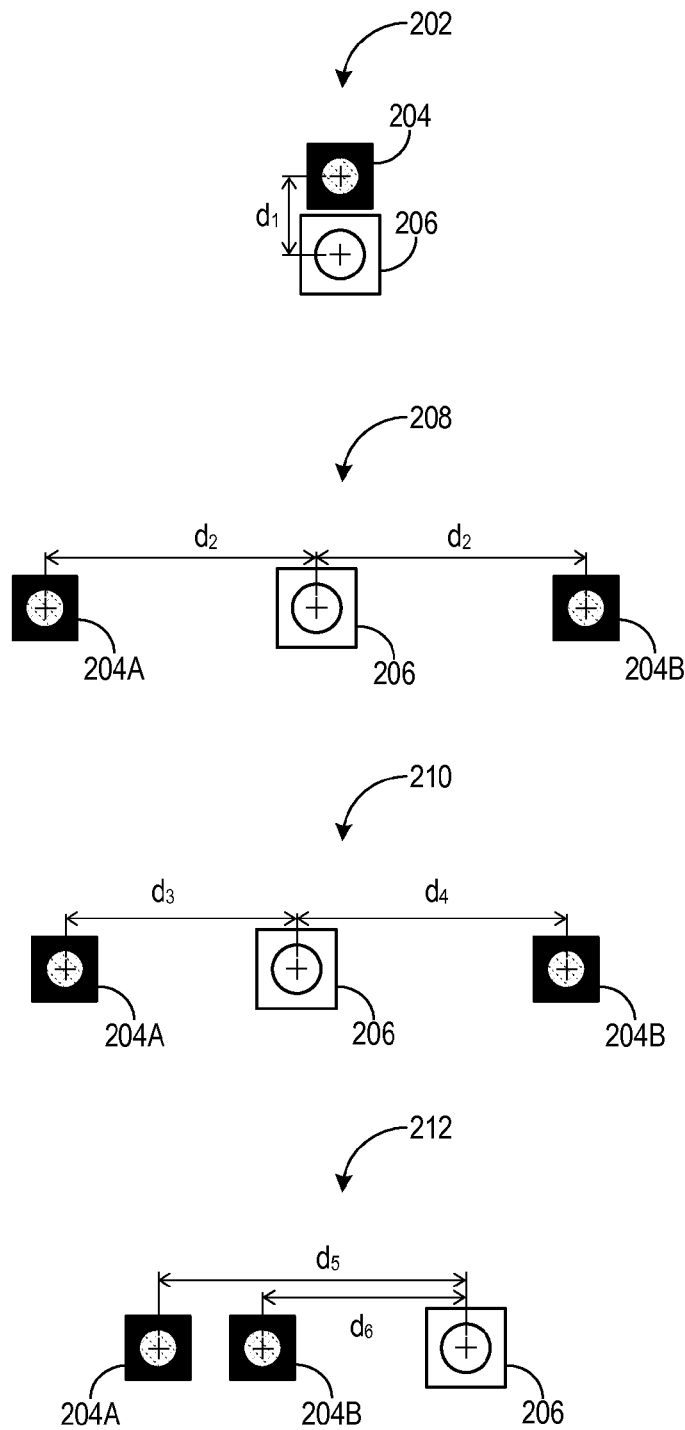
FIG. 2 shows various exemplary layouts of an iris illuminator/image sensor pair.

FIG. 2 shows various exemplary layouts of an iris illuminator/image sensor pair. While not shown in FIG. 2, the iris illuminator/image sensor pair may be disposed at any suitable location of a device housing—e.g., on a bezel, rear surface, and/or side surface of a mobile device such as mobile device 102 of FIG. 1, or on different surfaces. With reference to FIG. 1, the iris illuminators may be iris illuminator 108, the image sensors may be image sensor 110, and for the layouts that include two light sources, the two light sources may be light sources 108A and 108B, for example.

A first layout 202 includes a single light source 204 vertically displaced a distance $d_1$ above an image sensor 206. The relatively small distance $d_1$ may result in a relatively small subtended angle (e.g., <2°), which in turn may result in a condition referred to as "bright pupil" in which an image sensor perceives the pupil to be illuminated to a significantly greater degree than the iris of a given eye.

A second layout 208 includes first and second light sources 204A and 204B each laterally (e.g., horizontally) displaced in opposite directions the same distance $d_2$ from image sensor 206. The distance $d_2$ may be selected to achieve a relatively larger subtended angle (e.g., >8°), which in turn may result in a condition referred to as "dark pupil" in which an image sensor perceives the pupil to be illuminated to a significantly lesser degree than the iris of a given eye. For implementations in which images are captured using only one, or primarily one, of the first and second light sources 204A and 204B, the iris-to-pupil illumination ratio (e.g., grey level ratio) may be similar between images captured using only or primarily the first light source, and images captured using only or primarily the second light source, due to the common separation distance $d_2$.

A third layout 210 includes first and second light sources 204A and 204B each laterally displaced in opposite directions from image sensor 206. Unlike second layout 208, however, first and second light sources 204A and 204B are displaced from image sensor 206 by unequal distances—the first light source is positioned a distance $d_3$ away from the image sensor, whereas the second light source is positioned a relatively greater distance $d_4$ away from the image sensor. The separation distances $d_3$ and $d_4$ may be selected to achieve dark or bright pupil, but, due to their differing magnitude, may result in different subtended angles and thus different iris-to-pupil illumination ratios. Thus, an image captured using only, or primarily, first light source 204A may exhibit a first iris-to-pupil illumination ratio, whereas an image captured using only, or primarily, second light source 204B may exhibit a second iris-to-pupil illumination ratio different from the first ratio. For such implementations in which two different iris-to-pupil illumination ratios can be measured, both such ratios may be used as another biometric in performing user authentication (e.g., by comparing measured ratios to their previously-measured counterparts).

A fourth layout 212 includes first and second light sources 204A and 204B each laterally displaced in the same direction from image sensor 206 by respective unequal amounts $d_5$ and $d_6$. As with third layout 210, the unequal displacements of first and second light sources 204A and 204B from image sensor 206 may enable the measurement of two different iris-to-pupil illumination ratios.

It will be understood that the layouts shown in FIG. 2 are provided for the purpose of example and are not intended to be limiting in any way. One or more light sources may be displaced from an image sensor in any suitable manner—e.g., horizontally, vertically, laterally, radially, etc.

Figure 3:
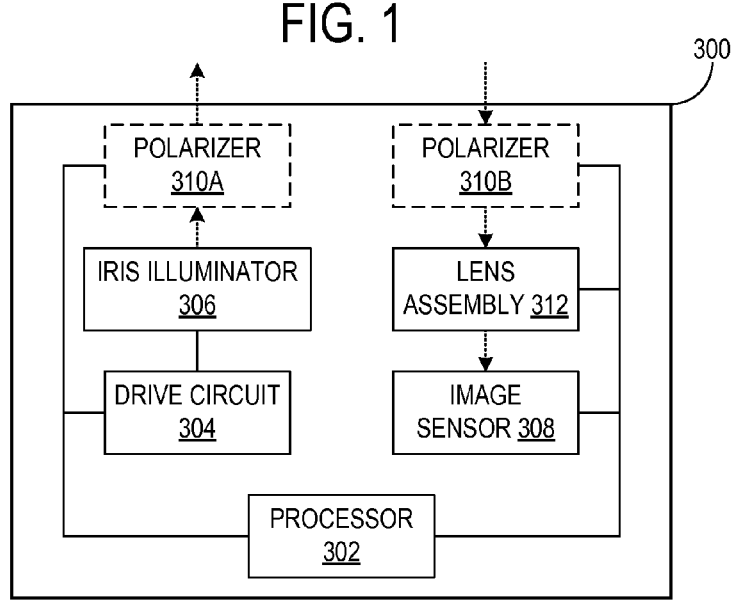
FIG. 3 schematically shows a biometric identification system.

FIG. 3 schematically shows a biometric identification system 300. System 300 may be implemented in mobile device 102 (FIG. 1), for example. System 300 includes a processor 302, which may be configured to execute instructions held on a suitable storage machine (not shown). Processor 302 is operatively coupled to a drive circuit 304, which is in turn operatively coupled to, and configured to drive, an iris illuminator 306, which may be iris illuminator 108 (FIG. 1), for example. In this way, light may be selectively emitted by system 300 for authenticating a user. Light reflected from the user as a result of his or her illumination by system 300 may be collected at an image sensor 308, where it may then be sensed and fed to processor 302 for processing as part of authenticating the user. Image sensor 308 may be of any suitable type, such as a CCD or CMOS sensor with sensitivity in the visible and infrared portions of the electromagnetic spectrum, for example.

In some implementations, drive circuit 304 may be configured to drive iris illuminator 306 in a first mode and a second mode that each cause the iris or irises of a user to be illuminated differently. Operating in the first mode yields a first mode output at image sensor 308, while operating in the second mode yields a second mode output at the image sensor. Processor 302 may be configured to process the first and second mode outputs, and in response to such processing, make a determination regarding how subsequent user authentication operations are to be performed. The first and second mode outputs may each comprise a respective image captured during a respective frame such that the first and second mode outputs may be captured in two frames, for example.

In some examples, processor 302 may select one or both of the first and second mode outputs for performing an iris authentication in response to processing the first and second mode outputs. Thus, the iris authentication may be performed using one or both of the first and second mode outputs following their capture and processing. When only one of the outputs is used, this selection may be performed in response to determining that its associated image is of significantly higher quality than that produced using the other mode. However, both mode outputs may be used if of sufficient quality.

Alternatively or in addition to selecting one or both of the first and second mode outputs for performing an iris authentication, processor 302 may select one or both of the first and second modes for use in performing the iris authentication in response to processing the first and second mode outputs. For example, in response to determining that one mode is producing better output, that mode may be selected or otherwise prioritized during subsequent illumination cycles. As a non-limiting example, processor 302 may assess quality via a signal-to-noise ratio (SNR) evaluation of each of the first and second mode outputs, and select based on higher SNR. Other processes by which the efficacy of a modal output in performing user authentication is assessed are possible, however.

In some implementations, drive circuit 304 may drive iris illuminator 306 alternately and time-sequentially in the first and second modes. Illuminator 306 may be driven for equal durations in the first and second modes with alternation being performed at any suitable rate (e.g., 30 Hz). In other examples, illuminator 306 may be driven for unequal durations in the first and second modes—for example, processor 302 may dynamically determine a duty cycle for each mode. Further, processor 302 may perform user authentication using each of the first and second mode outputs individually. In another example, processor 302 may perform authentication based on a combination of the first and second mode outputs.

From the above, it will be appreciated that iris authentication may occur over a duration in which multiple images are captured via use of two or more modes. Authentication may be performed with images from only one mode or with images from multiple modes. The different modes may be used equally over the interval, or at different frequencies, duty cycles, etc. based on the quality of mode outputs.

As indicated above, in some implementations, iris illuminator 306 may include first and second light sources (e.g., first and second light sources 108A and 108B of iris illuminator 108, all of FIG. 1). In such an example, drive circuit 304 may be configured to drive iris illuminator 306 in a first mode in which only the first light source is driven, and a second mode in which only the second light source is driven. The modes may be variously used, equally or non-equally as described above, with authentication performed using any number of images. For implementations in which the first and second light sources are spatially separated, alternate driving of the light sources may mitigate iris glare, as each light source may produce glare spots at different locations due to their differing locations of light emission. Alternatively or additionally, the first light source may be configured to emit light in a first range of emission angles, while the second light source may be configured to emit light in a second range of emission angles that differ from the first range of emission angles.

In some implementations, operating in the first mode causes iris illumination with light having a first range of wavelengths, while operating in the second mode causes iris illumination with light having a second range of wavelengths that differ from the first range of wavelengths. As regions of the human iris respond differently to different wavelengths of light, performing iris illumination at different wavelength ranges may yield a greater amount of useful data than that produced by performing iris illumination at a single wavelength range. As non-limiting examples, two or more wavelengths may be selected from the infrared, visible, or ultraviolet portions of the electromagnetic spectrum, or from a combination of these and potentially other portions (e.g., a visible and an infrared wavelength). In some examples, differing wavelengths, or ranges of wavelengths, may be achieved with two or more spatially separated light sources. In other cases, a single source may be employed to provide multiple wavelengths (e.g., by controlling a filter assembly not shown in FIG. 3, or by varying the voltage at which the light source is driven).

In some implementations, operating in the first mode causes iris illumination with light having a first polarization property, while operating in the second mode causes iris illumination with light having a second polarization property different from the first polarization property. As with varied wavelengths, regions of the human iris may respond differently to different polarizations of light. Accordingly, use of multiple polarization properties may yield more useful data than obtainable without diversified polarization. As non-limiting examples, the first and second polarization properties may each be one of non-polarization, linear polarization, and circular polarization. In particular, circular polarization may yield imagery of an eye that is independent of the rotational orientation of the eye.

FIG. 3 shows the potential inclusion of one or more polarizers in system 300—in particular, an emission-side polarizer 310A and a receiving-side polarizer 310B. Emission-side and receiving-side polarizers 310A and 310B may be configured to allow the transmission of light of a selected polarization (e.g., linearly polarized, circularly polarized, etc.) such that light having the selected polarization is substantially (e.g., 99% or greater) transmitted to image sensor 308, while light not having the selected polarization is substantially (e.g., 99% or greater) blocked or recycled into the allowed polarization state in order to increase efficiency of usage of the light source. In some implementations, an active polarizer assembly (not shown in FIG. 3) may be provided that enables two or more polarizations to be dynamically selected during operation. The active polarizer assembly may be controlled by processor 302 or a specific circuit not shown in FIG. 3, for example.

In some examples, receiving-side polarizer 310B may be configured to allow the transmission of light in a polarization state orthogonal to the polarization state of emitted light (e.g., light emitted from iris illuminator 306 without passing through a polarizer or after having passed through emission-side polarizer 310A). Such a configuration may be employed with or without time-sequential image capture, and in conjunction with one, two, or three or more light sources—for example, with reference to first layout 202 of FIG. 2, light source 204 may be configured to emit light in a first polarization state (e.g., via emission-side polarizer 310A), while image sensor 206 may be configured to receive reflected light in a second polarization state (e.g., via receiving-side polarizer 310B) orthogonal to the first state. In another example, two or more light sources may each emit light of the same polarization state, with polarizing optics being used to transmit light of the orthogonal polarization state to an image sensor. In yet another example, a first light source may emit light of a particular polarization (e.g., circular, linear), while a second light source may emit randomly polarized light. Generally, polarization may be leveraged to reduce glare in captured images—as polarized light illuminates an iris, a portion of the light may specularly reflect without substantially changing polarization state, while a different portion of the light may diffusely reflect and its polarization state be partially randomized; by filtering incident light to allow the transmission of light in the polarization state orthogonal to the state emitted, the specularly reflected portion, which can cause glare, may be substantially filtered out, providing imagery substantially free of surface reflections. It will be appreciated that the polarization configurations described herein are compatible with the layouts shown in FIG. 2.

Figure 4A:
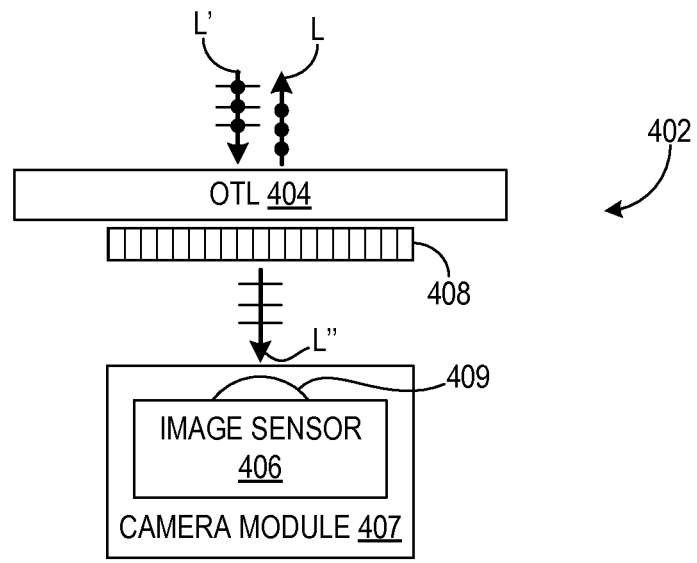
FIGS. 4A-4C show various optical stacks configured for light emission and/or capture using polarized light.
Figure 4A:
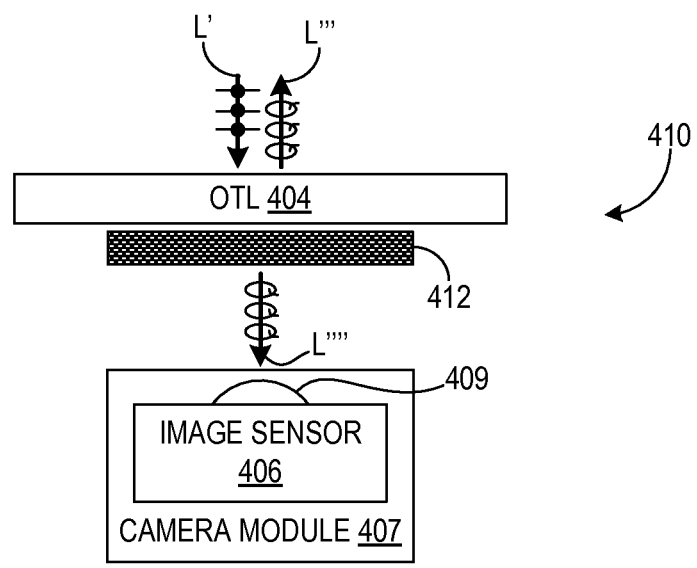
Figure 4B:
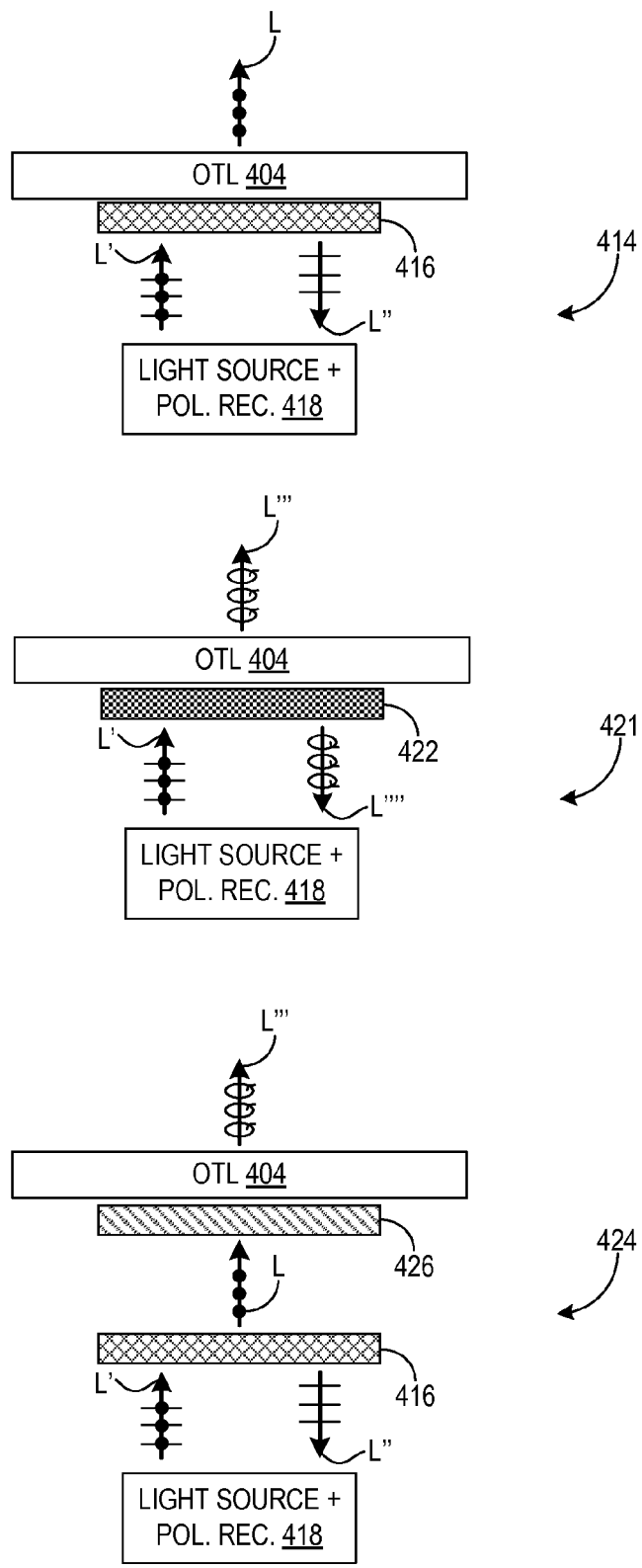
Figure 4C:
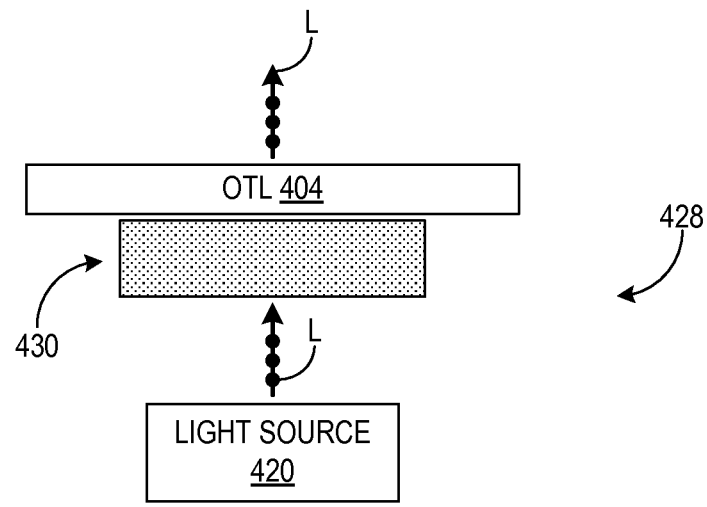
Figure 4C:
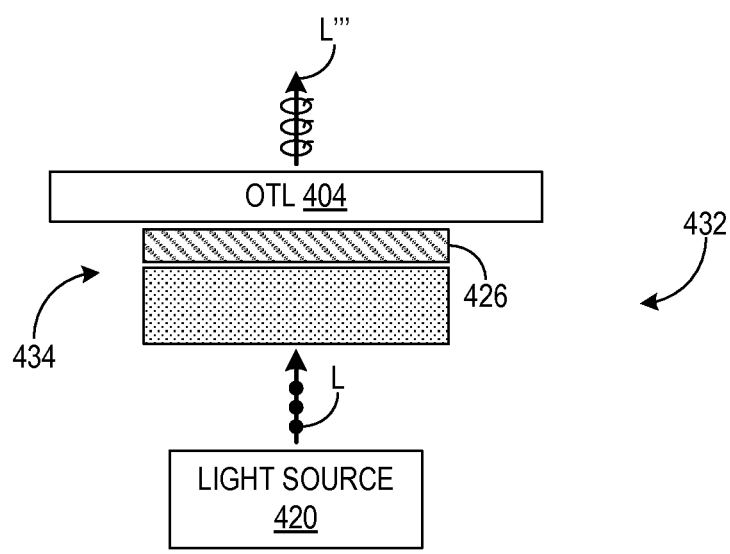

FIGS. 4A-4C show various optical stacks configured for light emission and/or capture using polarized light. The optical stacks may be incorporated in mobile device 102 (FIG. 1) and/or system 300 (FIG. 3), for example, and may at least partially enable the approaches to iris and user authentication described herein. It will be understood that various modifications to the optical stacks shown in FIGS. 4A-4C may be made without departing from the scope of this disclosure, including the addition of elements not shown and/or the removal of elements that are shown. Further, FIGS. 4A-4C illustrate how an optical stack may be configured to emit, as illumination light for a subject, light of a selected polarization while blocking light of the selected polarization from reaching an image sensor, and transmit light of a polarization orthogonal to the selected polarization to the image sensor. Such an approach may mitigate glare/ glint as described above.

FIG. 4A shows a first optical stack 402 including an optically transparent layer (OTL) 404 configured to transmit substantially all (e.g., 99% or more) incident visible light (and potentially other wavelengths such as infrared wavelengths), including light emitted from a light source (not shown) for illumination of a subject, and reflected light to be sensed by an image sensor 406 of a camera module 407. OTL 404 may comprise any suitable materials such as glass, for example. As shown in FIG. 4A, light L polarized along a first plane is emitted and transmitted through OTL 404, while randomly polarized light L' impinges upon the OTL. A polarizer 408, positioned optically between OTL 404 and camera module 407, transmits light L" polarized along a second plane orthogonal to the first plane while blocking light polarized along the first plane, such that substantially all (e.g., 99% or more) of the light received by the image sensor is light polarized along the second plane. Polarizer 408 may be any suitable type of polarizer such as a wire grid polarizer, for example.

For implementations in which infrared light is used as illumination light, OTL 404 may serve as coverglass and may include an infrared light transmitting and visible light blocking film (not shown in FIG. 4A), such as screened ink on the underside of OTL 404, which may serve to allow only a limited spectral band of wavelengths to transmit through to camera module 407. Alternatively or additionally, camera module 407 may include a bandpass filter (not shown in FIG. 4A) and/or a lens 409.

FIG. 4A also shows a second optical stack 410 configured for the transmission of circularly polarized light. In this example, circularly polarized light L''' of a first handedness (indicated by arrows in FIGS. 4A-4C) is emitted from a light source (not shown) and transmitted through OTL 404. Randomly polarized light L' impinges upon OTL 404 and reaches a polarizer assembly 412, which may include a circular polarizer, or alternatively, a quarter-wave plate and a linear polarizer. Polarizer assembly 412 may transmit substantially all (e.g., 99% or more) impinging circularly polarized light of a second handedness orthogonal to the first handedness of light L''' while blocking light that is not circularly polarized. As such, light L'''' having the second handedness is shown reaching image sensor 406.

Turning now to FIG. 4B, a third optical stack 414 illustrates the use of polarization recycling optics. Third optical stack 414 includes OTL 404 and a polarization splitter 416 operable to split light of differing polarizations. In the example depicted in FIG. 4B, polarization splitter 416 splits light of differing linear polarizations—e.g., light polarized along a first plane and light polarized along a second plane orthogonal to the first plane. A light source 418 (e.g., an infrared light emitting diode) emits randomly polarized light L' which reaches polarization splitter 416 where the light is split; light L polarized along the first plane is transmitted toward OTL 404, while light L" polarized along the second plane is transmitted back to the light source. Light source 418 includes polarization recycling optics which enables light L" to be recycled and used for illumination, increasing the optical efficiency of third optical stack 414.

An optical stack may be configured for the transmission of circularly polarized light and use of polarization recycling optics. A fourth optical stack 421 is one example of such an optical stack, employing a circular polarization splitter 422 for providing circularly polarized light L''' of a first handedness as illumination light, despite the emission of randomly polarized light L' from light source 418. Circular polarization splitter 422 may be a cholesteric circular polarizer film, for example, and may split left-handed and right-handed circularly polarized light such that circularly polarized light of the first handedness is transmitted while circularly polarized light of a second, orthogonal handedness is blocked (e.g., via reflection, rejection, or absorption).

FIG. 4B also shows a fifth optical stack 424 having light source 418. Randomly polarized light L' emitted by light source 418 impinges upon polarization splitter 416 which transmits light L polarized along the first plane to a quarter-wave plate 426 configured to convert the light L into circularly polarized light L''' (e.g., of the first handedness) for use as illumination light.

FIG. 4C illustrates the use of rescattering and light distribution optics. A sixth optical stack 428 includes OTL 404 and a light source 420 emitting linearly polarized light 404 L. Light source 420 may be an infrared laser, for example, which may obviate the inclusion of a polarizer and/or recycling optics by virtue of its output of polarized light. Light L emitted from light source 420 impinges upon an optical assembly 430, which includes a rescattering plane and light distribution optics. Optical assembly 430 may increase the apparent size of light source 420, increase the homogeneity of light transmitted through OTL 404, and may allow light transmitted through OTL 404 to match or exceed the FOV of an image sensor to increase the degree to which subjects are uniformly illuminated.

FIG. 4C also shows a seventh optical stack 432 configured for the emission of circularly polarized illumination light L''' (e.g., of the first handedness). Seventh optical stack 432 includes an optical assembly 434 comprising a rescattering plane, light distribution optics, and quarter-wave plate 426 for converting linearly polarized light L into circularly polarized light L'''.

Returning to FIG. 3, in view of how light emission in the first and second modes may differ, processor 302 may be configured to process mode outputs having differing wavelength, polarization, and emission angle and location. Processor 302 may then selectively use the first and second modes of light emission in a number of ways in response to processing the differing first and second mode outputs. For example, in response to processing the outputs, processor 302 may select wavelength range, polarization property, emission angle, and/or emission location (e.g., light source). In other words, mode selection and the use of associated parameters may be performed by assessing how varying each parameter affects image capture.

In other examples, processor 302 may utilize both the first and second modes of light emission in an alternating time-sequential manner. The selection of the time-sequential approach may or may not be in response to assessing quality of the first and second mode outputs. In such a configuration, light emitted in a first frame in the first mode, and light emitted in a second frame in the second mode following the first frame, may differ with respect to one or more of wavelength range, polarization property, emission angle, and emission location.

Such alternating light emission may be repeated iteratively as desired. The first and second mode outputs may be used individually. Alternatively, processor 302 may be configured to combine the first and second mode outputs and process the combined output—for example, the processor may spatially combine and process outputs differing with respect to one or more of wavelength range, polarization property, emission angle, and emission location. Thus, two or more different wavelengths, polarization properties, emission angles, and emission locations may be used in performing user authentication. In one example, the first and second mode outputs may include partial, and not full, images of a first iris and a second iris, respectively, of a user. Processor 302 may be configured to combine the partial iris images to produce a combined iris image, and process the combined iris image. This partial iris image combination process may at least partially mitigate the reduced accuracy of user authentication resulting from the optical constraints imposed by housing the optics of system 300 in a mobile device, for example.

System 300 further includes a lens assembly 312 comprising one or more optical elements (e.g., at least one converging lens) configured to transmit and focus impinging light to image sensor 308. Lens assembly 312 may have a variety of optical properties that at least partially enable the authentication described herein. For example, lens assembly 312 may facilitate the capture of light reflected from both irises of the user at a single image sensor and a common location, and/or the capture of eye and/or facial features of the user in addition to the irises from a common location. In particular, lens assembly 312 may be designed for a focal length between 200 and 500 mm, which may facilitate user authentication at arm's-length distances as described above. Lens assembly 312 may also have a FOV and numerical aperture (NA) tailored for such focal lengths and to achieve a minimum pixel density (in combination with image sensor 308) and a desired modulation transfer function (MTF). Selection of the optical properties of lens assembly 312 may include balancing competing properties such as depth of field (DOF) and MTF.

Lens assembly 312 (e.g., the at least one optical element) may be configured for fixed focus or adjustable focus operation. When configured for fixed focus operation, lens assembly 312 may have a greater DOF relative to the adjustable focus configuration. Conversely, when configured for adjustable focus operation, lens assembly 312 may exhibit greater MTF output but reduced DOF relative to the fixed focus configuration.

Regardless of whether adjustable or fixed focus is used, processor 302 may determine the distance from which a user is being imaged. Such distance is referred to herein as "z-distance", and generally corresponds to the (e.g., Euclidean) distance between a location of light emission or collection (e.g., the location at which iris illuminator 306 or image sensor 308 are disposed) on the device (e.g., mobile device 102 of FIG. 1) performing user authentication and a surface of a region (e.g., eyes, nasal bridge) of the user being imaged.

As described above, many prior iris and facial recognition systems force a user to place his or her head in a highly constrained location. This constraint allows z-distance to be assumed. Conversely, a significantly larger range of z-distances may be possible with the approaches described herein. Accordingly, in many examples, processor 302 and/or other components may be configured to determine, if desirable in a particular scenario, the z-distance to a user undergoing authentication.

In some examples, z-distance may be determined by assessing whether at least one image is near optimal focus—e.g., the focal length of lens assembly 312 for implementations in which the lens assembly is configured for fixed-focus. This assessment may generally include assessing the sharpness of features in an image, and particularly by determining the ratio of peak irradiance to roll-off of edge features via slope detection, for example. Edge features of objects imaged may provide image content having intensity profiles, or grey level profiles as captured by an image sensor, which may exhibit a slope; steeper slopes may indicate an image that is relatively more in focus than an image having less steep slopes. As a non-limiting example, one type of filter which can assess slopes of edge features is a Hessian filter. In some examples, processor 302 may be configured to process a series of images received at image sensor 308, each captured at a different z-distance. Each image in the series of images may be processed by analyzing the sharpness of one or more features in that image. The focal length associated with the sharpest image may be selected as the z-distance. For adjustable focus implementations, processor 302 may determine an optimized focus (e.g., optimized focal length) of lens assembly 312 by processing the series of images received at image sensor 308 and assessing the sharpness of one or more features in the images. The focus of lens assembly 312 may be set to the focal length at which the image having the greatest sharpness was captured.

The determination of z-distance may enable the determination of other parameters such as IPD, which can be determined in an at least partially trigonometric manner based on z-distance and FOV.

IPD itself may be used to assess the nearness of lens assembly 312 to its optimized focus. In one implementation, an average IPD representing the average IPD of the human population may be determined based on known survey data of human IPDs. The number of pixels that would be expected in an image captured of a human subject having the average IPD, with lens assembly 312 at or near optimal focus (e.g., focal length of 250 mm), may then be determined based on known properties of the lens assembly and image sensor 308. The number of pixels corresponding to the IPD of a human subject subsequently imaged may then be compared to the number of pixels corresponding to average IPD to assess nearness to optimal focus. Once the number of IPD pixels for a given human subject is known, this number may be consulted in subsequent user authentication sessions to guide the human subject to an optimal z-distance. Alternatively or additionally, data collected during a subsequent user authentication session may be weighted according to the difference between the instant number of IPD pixels and the previously determined number of IPD pixels for that human subject.

Figure 5:
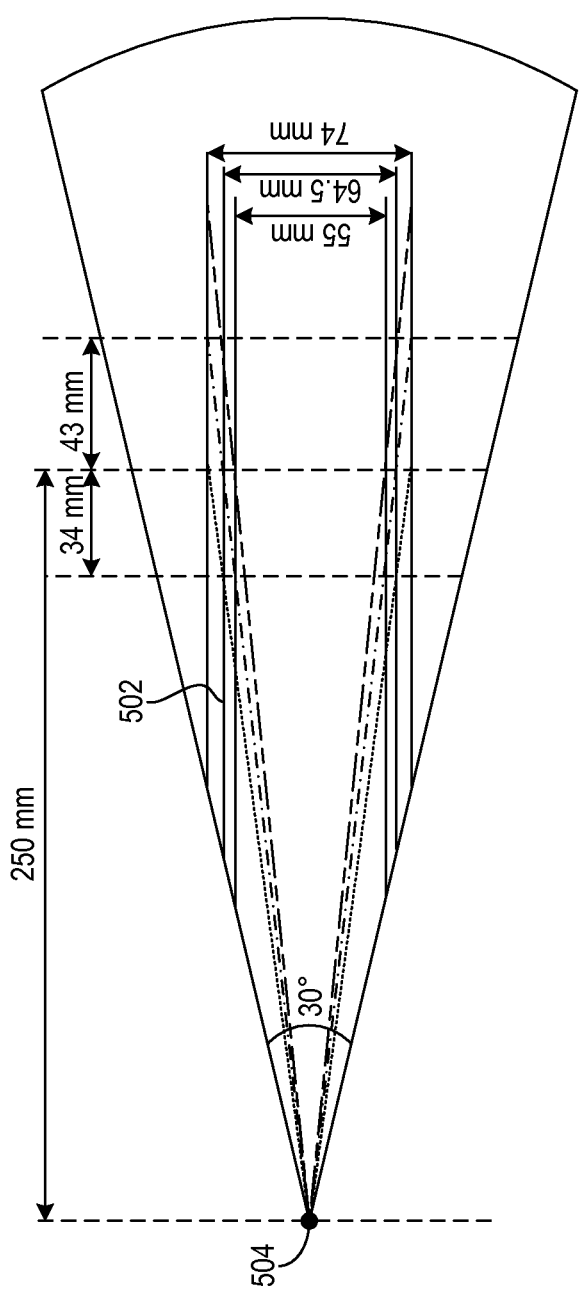
FIG. 5 illustrates an example comparison of instant IPD to average IPD.

FIG. 5 depicts an example of how comparing captured IPD of a human subject to average human IPD may yield a numerical estimate of the distance of lens assembly 312 from its optimal focus. In the depicted example, three sets of pupils each having a different IPD are imaged by a lens assembly such as lens assembly 312 of FIG. 3, which has an exemplary focal length of 250 mm and an FOV of 30°. The three sets of pupils have IPDs of 74 mm, 64.5 mm, and 55 mm, respectively. As can be seen in FIG. 5, the lower extreme IPD of 55 mm crosses an average IPD field line 502 approximately 34 mm closer to a focal point 504 than the focal length, whereas the upper extreme IPD of 74 mm crosses the average IPD field line approximately 43 mm farther than the focal length. As such, it may be detected whether an image is within −34 mm/+43 mm from ideal focus without knowing the IPD of the human subject being imaged. It will be understood that the numerical values (e.g., FOV, focal length, IPDs) are non-limiting examples, and that the approach to detecting the deviation of an image from ideal focus is applicable to systems having other numerical values.

Returning to FIG. 3, it will be appreciated that biometric identification system 300 is provided as an example and may be modified without departing from the scope of this disclosure. For example, system 300 may include an optical window (not shown in FIG. 3) downstream of emission-side polarizer 310A, and another optical window (not shown in FIG. 3) upstream of receiving-side polarizer 310B. Alternatively or additionally, receiving-side polarizer 310B may be positioned downstream lens assembly 312 rather than upstream. In other implementations, one or more of an iris illuminator, polarizer, lens assembly, and image sensor may be provided for each of two eyes. Further, processor 302 may be operable to drive iris illuminator in three or more modes each causing the irises of a user to be illuminated differently.

Figure 6:
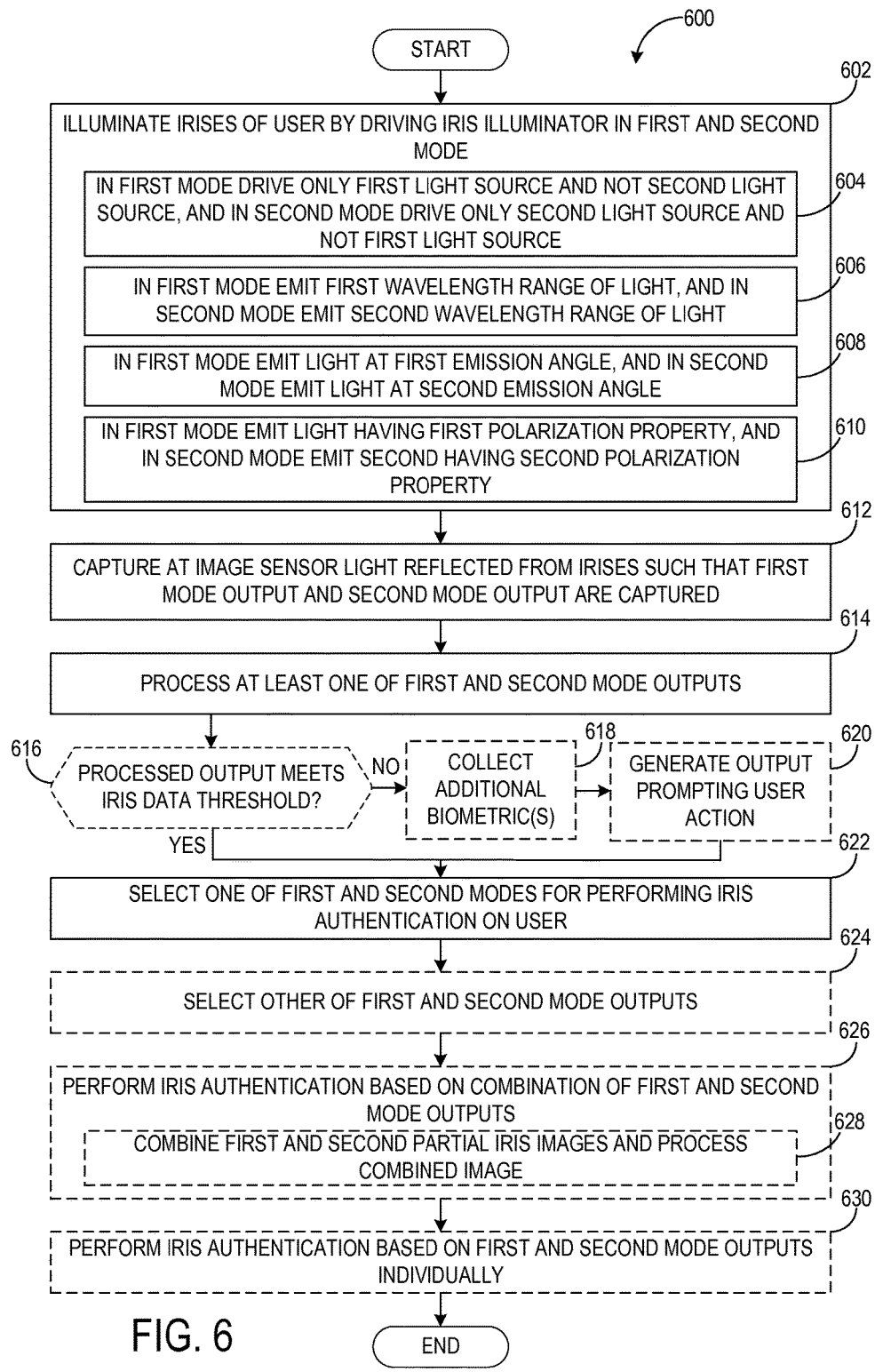
FIG. 6 shows a flowchart illustrating a method for performing user authentication.

FIG. 6 shows a flowchart illustrating a method 600 for performing user authentication. Method 600 may be executed by mobile device 102 (FIG. 1) and/or biometric identification system 300 (FIG. 3), for example. Further, method 600 may be executed by a computing device 700 described below with reference to FIG. 7. Though the method may be carried out by components and devices other than those shown in FIGS. 1, 2 and 5, the method may be carried out in a way that incorporates functionality described in connection with those figures and with FIG. 3.

At 602 of method 600, the irises of a user are illuminated by driving an iris illuminator in a first mode and in a second mode. Iris illumination may include, at 604 of method 600, driving only a first light source in the first mode, driving only a second light source in the second mode. The first and second light sources may be spatially separate. Iris illumination may include, at 606 of method 600, emitting a first wavelength range of light in the first mode, and emitting a second wavelength range of light different from the first range in the second mode. Iris illumination may include, at 608 of method 600, emitting light at a first emission angle in the first mode, and emitting light at a second emission angle different from the first angle in the second mode. Iris illumination may include, at 610 of method 600, emitting light having a first polarization property in the first mode, and emitting light having a second polarization property different from the first polarization property in the second mode.

At 612 of method 600, light reflected from the irises of the user is captured at an image sensor such that a first mode output and a second mode output are captured. The first mode output and second mode output may correspond to light reflected as a result of illumination in the first mode and in the second mode, respectively, and as such may provide output produced with light of differing source, wavelength, emission angle, and/or polarization property.

At 614 of method 600, at least one of the first and second mode outputs is processed. The processing may include, for example, assessing at least one modal output for its efficacy in performing user authentication.

At 616 of method 600, it may be optionally determined whether the output processed at 614 meets an iris data threshold (e.g., quality threshold). If it is determined that the processed output does meet (YES) the iris data threshold, method 600 proceeds to 622. If it is determined that the processed output does not meet (NO) the iris data threshold, method 600 proceeds to 618.

At 618 of method 600, one or more additional biometrics may be optionally collected. For example, one or more of a pupil boundary, limbus boundary, IPD, eye shape, eyelid shape, eyebrow shape, eye movement, and eye constriction/dilation may be measured. Capturing images of one or more facial features may yield a facial mode output at the image sensor. Performing an authentication of the one or more facial features derived from the facial mode output may augment user authentication using iris recognition.

At 620 of method 600, output prompting user action is optionally generated. For example, output prompting a user to adjust his or her gaze and/or head orientation may be generated and sent to a display device. Following 620, method 600 proceeds to 622.

At 622 of method 600, one of the first and second modes is selected for performing an iris authentication on a user.

At 624 of method 600, the other of the first and second modes is optionally selected for performing an iris authentication on a user—e.g., the mode not selected at 622 may be selected at 624.

At 626 of method 600, an iris authentication may optionally be performed based on a combination of the first and second mode outputs. Performing the iris authentication based on this combination may include, at 628 of method 600, combining first and second partial iris images and processing the combined iris image.

At 630 of method 600, an iris authentication may optionally be performed based on the first and second mode outputs individually.

It will be understood that the approaches described herein are applicable to implementations in which a single iris, and not both irises, of a user is authenticated. In such implementations, the single iris may be illuminated according to one or more modes that each cause the single iris to be illuminated differently. Iris illumination, and capture of reflected light resulting from iris illumination, may or may not include at least partial illumination and capture of both irises, even if only the single iris is authenticated.

In some implementations, the methods and processes described herein may be tied to a computing system of one or more computing devices. In particular, such methods and processes may be implemented as a computer-application program or service, an application-programming interface (API), a library, and/or other computer-program product.

Figure 7:
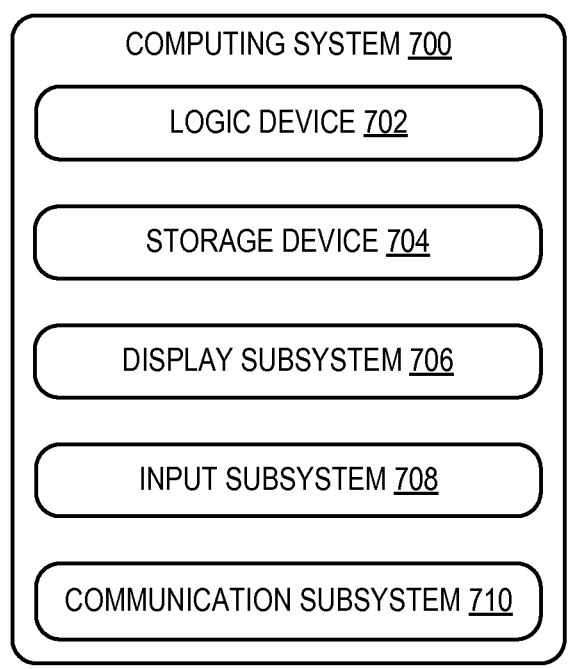
FIG. 7 shows an example computing system.

FIG. 7 schematically shows a non-limiting embodiment of a computing system 700 that can enact one or more of the methods and processes described above. Computing system 700 is shown in simplified form. Computing system 700 may take the form of one or more personal computers, server computers, tablet computers, home-entertainment computers, network computing devices, gaming devices, mobile computing devices, mobile communication devices (e.g., smart phone), wearable computing device, and/or other computing devices.

Computing system 700 includes a logic device 702 and a storage device 704. Computing system 700 may optionally include a display subsystem 505, input subsystem 708, communication subsystem 710, and/or other components not shown in FIG. 7.

Logic device 702 includes one or more physical devices configured to execute instructions. For example, the logic device may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic device may include one or more processors configured to execute software instructions. Additionally or alternatively, the logic device may include one or more hardware or firmware logic devices configured to execute hardware or firmware instructions. Processors of the logic device may be single-core or multi-core, and the instructions executed thereon may be configured for sequential, parallel, and/or distributed processing. Individual components of the logic device optionally may be distributed among two or more separate devices, which may be remotely located and/or configured for coordinated processing. Aspects of the logic device may be virtualized and executed by remotely accessible, networked computing devices configured in a cloud-computing configuration.

Storage device 704 includes one or more physical devices configured to hold instructions executable by the logic device to implement the methods and processes described herein. When such methods and processes are implemented, the state of storage device 704 may be transformed—e.g., to hold different data.

Storage device 704 may include removable and/or built-in devices. Storage device 704 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage device 704 may include volatile, nonvolatile, dynamic, static, read/write, read-only, random-access, sequential-access, location-addressable, file-addressable, and/or content-addressable devices. Further, storage device 704 may be configured to encrypt data such as processed biometric information as part of a security protocol.

It will be appreciated that storage device 704 includes one or more physical devices. However, aspects of the instructions described herein alternatively may be propagated by a communication medium (e.g., an electromagnetic signal, an optical signal, etc.) that is not held by a physical device for a finite duration.

Aspects of logic device 702 and storage device 704 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

It will be appreciated that a "service", as used herein, is an application program executable across multiple user sessions. A service may be available to one or more system components, programs, and/or other services. In some implementations, a service may run on one or more server-computing devices.

When included, display subsystem 505 may be used to present a visual representation of data held by storage device 704. This visual representation may take the form of a graphical user interface (GUI). As the herein described methods and processes change the data held by the storage device, and thus transform the state of the storage device, the state of display subsystem 505 may likewise be transformed to visually represent changes in the underlying data. Display subsystem 505 may include one or more display devices utilizing virtually any type of technology. Such display devices may be combined with logic device 702 and/or storage device 704 in a shared enclosure, or such display devices may be peripheral display devices.

When included, input subsystem 708 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 710 may be configured to communicatively couple computing system 700 with one or more other computing devices. Communication subsystem 710 may include wired and/or wireless communication devices compatible with one or more different communication protocols. As non-limiting examples, the communication subsystem may be configured for communication via a wireless telephone network, or a wired or wireless (e.g., BLUETOOTH) local- or wide-area network. In some embodiments, the communication subsystem may allow computing system 700 to send and/or receive messages to and/or from other devices via a network such as the Internet.

Another example provides a biometric identification system comprising an iris illuminator, an image sensor configured to capture light reflected from irises of a user as a result of those irises being illuminated by the iris illuminator, a drive circuit configured to drive the iris illuminator in a first mode and a second mode that each cause the irises to be illuminated differently, the first and second modes thereby yielding a first mode output at the image sensor and a second mode output at the image sensor, respectively, and a processor configured to process at least one of the first mode output and the second mode output and, in response to such processing, select one of the first mode and the second mode for use in performing an iris authentication on the user. In such an example, the iris illuminator alternatively or additionally may include a first light source and a second light source. In such an example, in the first mode, only the first light source, and not the second light source, alternatively or additionally may be driven. In such an example, in the second mode, only the second light source, and not the first light source, alternatively or additionally may be driven. In such an example, the first and second light sources alternatively or additionally may be spatially separated. In such an example, the first light source alternatively or additionally may be configured to emit light in a first range of emission angles. In such an example, the second light source alternatively or additionally may be configured to emit light in a second range of emission angles. In such an example, the second range alternatively or additionally may differ from the first range. In such an example, the processor alternatively or additionally may be configured to perform the iris authentication on the user by combining a first partial image of a first iris of the user with a second partial image of a second iris of the user to produce a combined iris image, and process the combined iris image. In such an example, the processor alternatively or additionally may be configured to, after selecting one of the first and second modes, select the other of the first and second modes. In such an example, the processor alternatively or additionally may be configured to perform the iris authentication based on a combination of the first and second mode outputs. In such an example, the first mode alternatively or additionally may cause iris illumination with light having a first range of wavelengths. In such an example, the second mode alternatively or additionally may cause iris illumination with light having a second range of wavelengths. In such an example, the second range of wavelengths alternatively or additionally may differ from the first range of wavelengths. In such an example, the first mode alternatively or additionally may cause iris illumination with light having a first polarization property. In such an example, the second mode alternatively or additionally may cause iris illumination with light having a second polarization property. In such an example, the first and second polarization properties alternatively or additionally may respectively include polarizations that are mutually orthogonal. In such an example, the image sensor alternatively or additionally may be configured to capture light reflected from a face of the user thereby yielding a facial mode output at the image sensor. In such an example, the processor alternatively or additionally may be configured to augment the iris authentication of the user by performing an authentication of one or more facial features derived from the facial mode output. In such an example, the one or more facial features alternatively or additionally may include a pupil boundary, a limbus boundary, an interpupilary distance, eye movement, pupil dilation and/or constriction, eye shape, eyelid shape, and eyebrow shape. In such an example, the processor alternatively or additionally may be configured to, in response to such processing, determine whether the processed output of one of the first and second mode outputs meets an iris data threshold. In such an example, the processor alternatively or additionally may be configured to, if the processed output does not meet the iris data threshold, generate output prompting the user to alter a gaze and/or head orientation of the user. In such an example, the processor alternatively or additionally may be configured to determine an optimized focus or a z-distance of the optical element by processing a series of images received at the image sensor, each image being captured at a different z-distance, the processing including assessing a sharpness of one or more features in the images. In such an example, the processor alternatively or additionally may be configured to determine an interpupilary distance of the user based on an image in the series of images assessed to have a greatest sharpness. Any or all of the above-described examples may be combined in any suitable manner in various implementations.

Another example provides a method of biometric identification comprising illuminating irises of a user by driving an iris illuminator in a first mode and in a second mode that each cause the irises to be illuminated differently, capturing at an image sensor light reflected from the irises of the user as a result of those irises being illuminated by the iris illuminator driven in the first and second modes such that a first mode output and a second mode output are captured at the image sensor, processing at least one of the first mode output and the second mode output, and in response to such processing, selecting one of the first mode and the second mode for use in performing an iris authentication on the user. In such an example, the iris illuminator alternatively or additionally may include a first light source and a second light source. In such an example, in the first mode, only the first light source, and not the second light source, alternatively or additionally may be driven. In such an example, in the second mode, only the second light source, and not the first light source, alternatively or additionally may be driven. In such an example, the method alternatively or additionally may comprise, after selecting one of the first and second modes, selecting the other of the first and second modes. In such an example, the method alternatively or additionally may comprise performing the iris authentication based on a combination of the first and second mode outputs. In such an example, the first mode output alternatively or additionally may be a first partial image of a first iris of the user. In such an example, the second mode output alternatively or additionally may be a second partial image of a second iris of the user. In such an example, the combination of the first and second mode outputs alternatively or additionally may be a combined iris image. In such an example, one or both of a wavelength range and a polarization property of light emitted in the first mode alternatively or additionally may differ from one or both of a wavelength range and a polarization property of light emitted in the second mode, respectively. Any or all of the above-described examples may be combined in any suitable manner in various implementations.

Another example provides a biometric identification system comprising an iris illuminator, an image sensor configured to capture light reflected from irises of a user as a result of those irises being illuminated by the iris illuminator, a drive circuit configured to alternately drive the iris illuminator in a first mode and a second mode that each cause the irises to be illuminated differently, the first and second modes thereby yielding a first mode output at the image sensor and a second mode output at the image sensor, respectively, and a processor configured to process at least one of the first mode output and the second mode output and, in response to such processing, select one of the first mode and the second mode for use in performing an iris authentication on the user by combining a first partial image of a first iris of the user with a second partial image of a second iris of the user to produce a combined iris image, and processing the combined iris image. Any or all of the above-described examples may be combined in any suitable manner in various implementations.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A biometric identification system, comprising:
   an iris illuminator;
   an image sensor configured to capture light reflected from irises of a user as a result of those irises being illuminated by the iris illuminator;
   a drive circuit configured to drive the iris illuminator in a first mode and a second mode that cause the irises to be respectively illuminated with light having a first parameter and light having a second parameter, the first and second modes thereby yielding a first mode output at the image sensor and a second mode output at the image sensor, respectively, where each of the first mode output and the second mode output is independently useable to perform an iris authentication on the user; and
   a processor configured to process at least one of the first mode output and the second mode output and, in response to such processing, (1) select one of the first mode and the second mode for use in performing an iris authentication on the user; (2) perform such iris authentication with the selected mode and without using the non-selected mode; and (3) determine a selective use of one or both of the first mode and the second mode for implementation in subsequent iris authentication.

2. The biometric identification system of claim 1, wherein the iris illuminator includes a first light source and a second light source,
   in the first mode, only the first light source, and not the second light source, is driven, and in the second mode, only the second light source, and not the first light source, is driven.

3. The biometric identification system of claim 2, wherein the first and second light sources are spatially separated.

4. The biometric identification system of claim 2, wherein
the first light source is configured to emit light in a first range of emission angles, and
the second light source is configured to emit light in a second range of emission angles, the second range differing from the first range.

5. The biometric identification system of claim 1, wherein the processor is further configured to perform the iris authentication on the user by:
combining a first partial image of a first iris of the user with a second partial image of a second iris of the user to produce a combined iris image, and
process the combined iris image.

6. The biometric identification system of claim 1, wherein the processor is further configured to:
after selecting one of the first and second modes, select the other of the first and second modes, and
perform an additional iris authentication based on a combination of the first and second mode outputs.

7. The biometric identification system of claim 1, wherein
the first mode causes iris illumination with light having a first range of wavelengths, and
the second mode causes iris illumination with light having a second range of wavelengths, the second range of wavelengths differing from the first range of wavelengths.

8. The biometric identification system of claim 1, wherein
the first mode causes iris illumination with light having a first polarization property, and
the second mode causes iris illumination with light having a second polarization property.

9. The biometric identification system of claim 8, wherein the first and second polarization properties respectively include polarizations that are mutually orthogonal.

10. The biometric identification system of claim 1, wherein
the image sensor is further configured to capture light reflected from a face of the user thereby yielding a facial mode output at the image sensor, and
the processor is further configured to augment the iris authentication of the user by performing an authentication of one or more facial features derived from the facial mode output.

11. The biometric identification system of claim 10, wherein the one or more facial features include a pupil boundary, a limbus boundary, an interpupilary distance, eye movement, pupil dilation and/or constriction, eye shape, eyelid shape, and eyebrow shape.

12. The biometric identification system of claim 1, wherein the processor is further configured to:
in response to such processing, determine whether the processed output of one of the first and second mode outputs meets an iris data threshold, and
if the processed output does not meet the iris data threshold, generate output prompting the user to alter a gaze and/or head orientation of the user.

13. The biometric identification system of claim 1, further comprising an optical element, wherein the processor is further configured to determine an optimized focus or a z-distance of the optical element by processing a series of images received at the image sensor, each image being captured at a different z-distance, the processing including assessing a sharpness of one or more features in the images.

14. The biometric identification system of claim 13, wherein the processor is further configured to determine an interpupilary distance of the user based on an image in the series of images assessed to have a greatest sharpness.

15. A method of biometric identification, comprising:
illuminating irises of a user by driving an iris illuminator in a first mode and in a second mode that cause the irises to be respectively illuminated with light having a first parameter and light having a second parameter;
capturing at an image sensor light reflected from the irises of the user as a result of those irises being illuminated by the iris illuminator driven in the first and second modes such that a first mode output and a second mode output are captured at the image sensor, where each of the first mode output and the second mode output is independently useable to perform an iris authentication on the user;
processing at least one of the first mode output and the second mode output; and
in response to such processing, (1) selecting one of the first mode and the second mode for use in performing an iris authentication on the user, (2) performing such iris authentication with the selected mode and without using the non-selected mode, and (3) determining a selective use of one or both of the first mode and the second mode for implementation in subsequent iris authentication.

16. The method of claim 15, wherein
the iris illuminator includes a first light source and a second light source,
in the first mode, only the first light source, and not the second light source, is driven, and
in the second mode, only the second light source, and not the first light source, is driven.

17. The method of claim 15, further comprising:
after selecting one of the first and second modes, selecting the other of the first and second modes; and
performing an additional iris authentication based on a combination of the first and second mode outputs.

18. The method of claim 17, wherein
the first mode output is a first partial image of a first iris of the user,
the second mode output is a second partial image of a second iris of the user, and
the combination of the first and second mode outputs is a combined iris image.

19. The method of claim 15, wherein one or both of a wavelength range and a polarization property of light emitted in the first mode differ from one or both of a wavelength range and a polarization property of light emitted in the second mode, respectively.

20. A biometric identification system, comprising:
an iris illuminator;
an image sensor configured to capture light reflected from irises of a user as a result of those irises being illuminated by the iris illuminator;
a drive circuit configured to alternately drive the iris illuminator in a first mode and a second mode that cause the irises to be respectively illuminated with light having a first parameter and light having a second parameter, the first and second modes thereby yielding a first mode output at the image sensor and a second mode output at the image sensor, respectively, where each of the first mode output and the second mode output is independently useable to perform an iris authentication on the user; and a processor configured to process at least one of the first mode output and the second mode output and, in response to such processing, (1) select one of the first mode and the second mode for use in performing an iris authentication on the user; (2) perform such iris authentication with the selected mode and without using the non-selected mode; and (3) determine a selective use of one or both of the first mode and the second mode for implementation in subsequent iris authentication, wherein performing iris authentication includes combining a first partial image of a first iris of the user with a second partial image of a second iris of the user to produce a combined iris image, and processing the combined iris image.

21. The biometric identification system of claim 1, wherein determining a selective use of one or both of the first mode and the second mode for implementation in subsequent iris authentication includes determining a first duty cycle for driving the first mode and a second duty cycle for driving the second mode.

22. The biometric identification of claim 1, wherein the first mode includes 1) emitting light of a first polarization state, and 2) capturing light reflected by a human iris and received through a receiving-side polarizer configured to transmit light of a second polarization state orthogonal to the first polarization state.

23. The biometric identification system of claim 1, wherein the light having the first parameter has a first polarization property and the light having the second parameter has a second polarization property, the first and second polarization properties configured to cause regions of a human iris to respond differently, when illuminated with the first mode, than when illuminated with the second mode.

* * * * *